April 25, 1939. C. L. BOND 2,155,582
FOLDING TRAILER
Filed Dec. 23, 1936 2 Sheets-Sheet 1
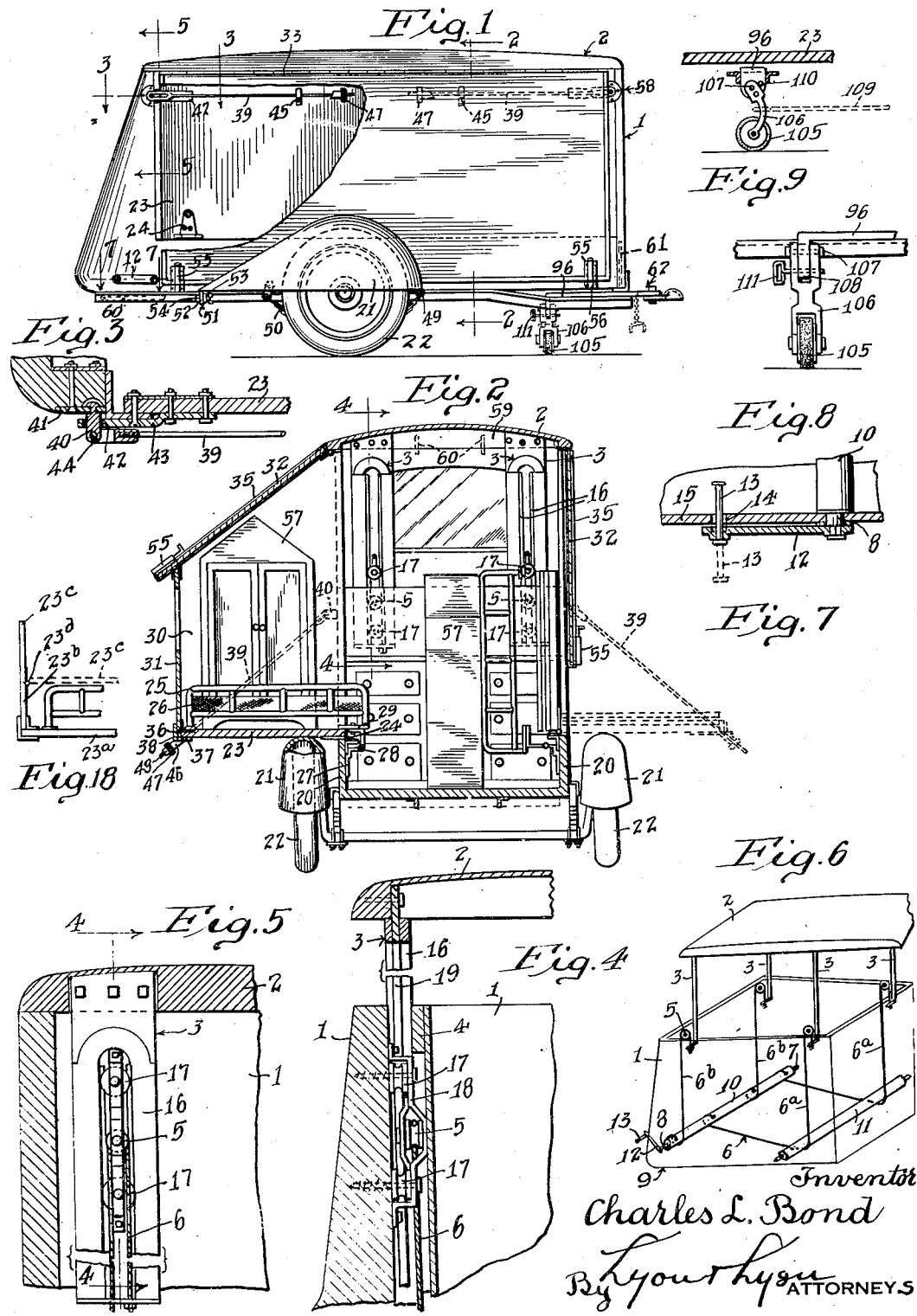

April 25, 1939.  C. L. BOND  2,155,582
FOLDING TRAILER
Filed Dec. 23, 1936  2 Sheets-Sheet 2
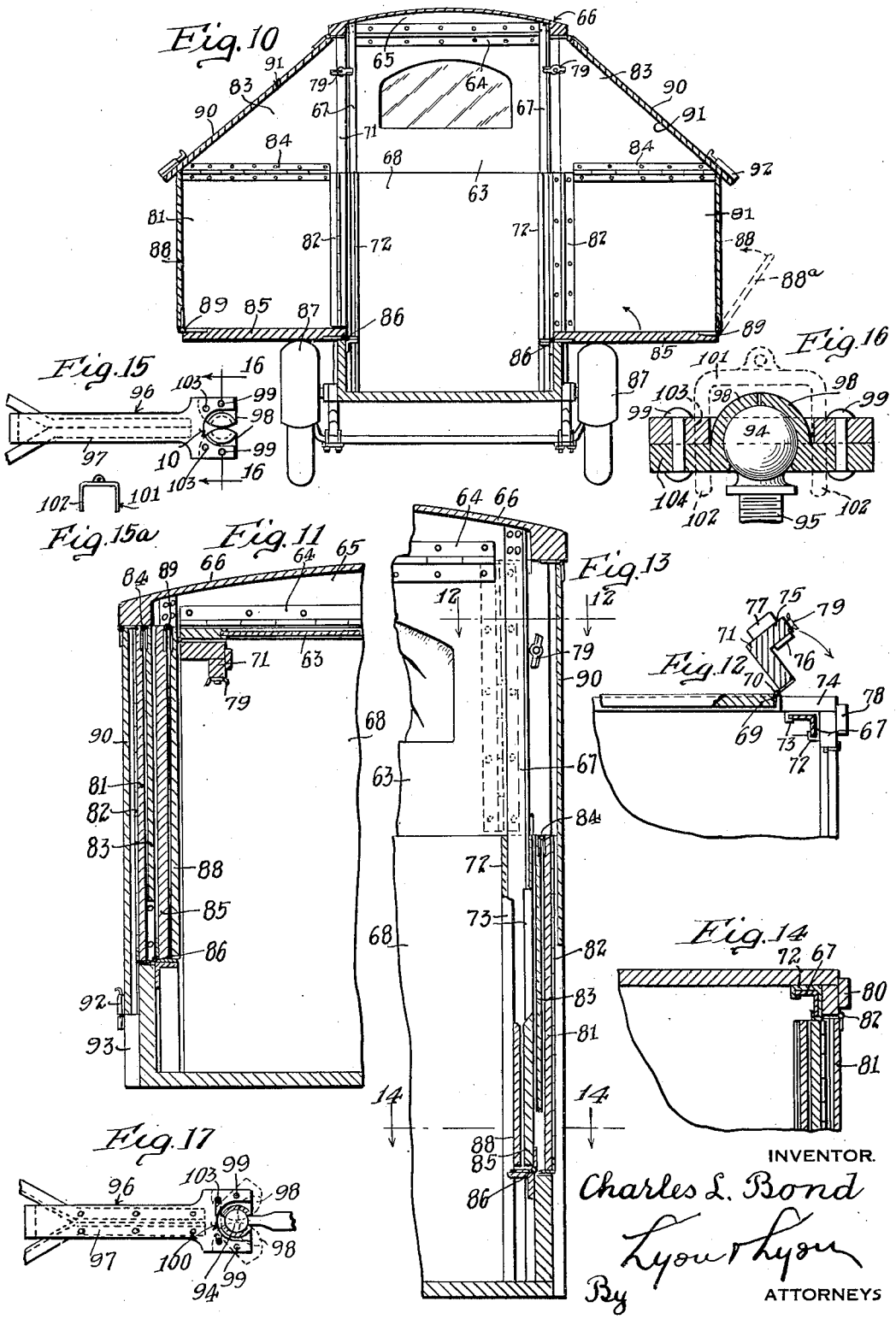
INVENTOR.
Charles L. Bond
By Lyon & Lyon
ATTORNEYS Patented Apr. 25, 1939

2,155,582

UNITED STATES PATENT OFFICE 2,155,582

FOLDING TRAILER

Charles L. Bond, Los Angeles, Calif.

Application December 23, 1936, Serial No. 117,346

12 Claims. (Cl. 296—23)

This invention relates to automobile trailers. The general object of the invention is to produce a trailer having means for increasing its floor space, and constructed so as to enable the trailer to assume a folded condition with the extended parts held in a folded and compact condition.

One of the objects of the invention is to provide simple means for raising the top of the trailer at four points; also to provide a trailer with side floors capable of being extended from the side of the trailer to increase the floor space, and to provide simple and effective means for supporting the side floors or extension floors in their horizontal position, to form wings for the trailer at its sides.

A further object of the invention is to provide means whereby a portion of the weight of the extended side floors may be supported on the wheels of the trailer.

In the preferred construction the side floors are hinged at the sides of the trailer so that they can be swung out into a substantially horizontal position over the wheels, and one of the objects of the invention is to provide improved construction for tie rods, which support the extended side floors at their outer corners; also to construct the tie rods in such a way as to enable them to be swung inwardly against the outer faces of the side floors when the same have been swung up to their vertical or folded position.

A further object of the invention is to provide the elevating means that elevates the trailer top, with an operating handle, which can be normally held in a withdrawn position within the trailer so that it does not project out from its side.

A further object of the invention is to provide a folding trailer of simple construction in which upwardly folding side floors are provided, and in which the sides of the folded trailer operate to form a closure or cover for the outer sides of the side floors when in their folded condition; also to provide a folding trailer having a construction which will particularly facilitate the stowing of the extension end walls and outer side walls of the trailer when the trailer is in its folded condition.

Further objects of the invention will appear hereinafter.

The invention consists in the novel parts and combination of parts to be described hereinafter, all of which contribute to produce an efficient folding trailer.

A preferred embodiment of the invention is described in the following specification, while the broad scope of the invention is pointed out in the appended claims.

In the drawings:

Figure 1 is a side elevation of a trailer embodying my invention, in its folded condition, a portion of the side wall of the folded trailer being broken away to further illustrate details of the construction, and particularly showing the relation of the tie rods and the manner in which they hold the side floors in their elevated position.

Fig. 2 is a vertical section through the trailer about on the line 2—2 of Fig. 1, but showing one side of the trailer extended and set up as it would be when the trailer would be in use; at the opposite side the right side floor is represented folded up in position behind a roof section, which is hanging in its folded condition. At the right side also, the right side floor is indicated in dotted lines in its extended horizontal position. In this view, a portion of the wheel fender is broken away and shown partially in section to illustrate how a portion of the weight of the adjacent side floor can be taken on the wheel.

Fig. 3 is a horizontal section taken on the line 3—3 of Fig. 1 upon an enlarged scale and particularly illustrating the details of the construction of the adjacent tie rod and the means for mounting the same. In this view adjacent portions of the trailer are broken away as is also the free portion of the tie rod.

Fig. 4 is a vertical section taken about on the line 4—4 of Fig. 2. The point of taking this section 4—4 is also indicated by the section line 4—4 on Fig. 5.

Fig. 5 is a section upon an enlarged scale taken about in the plane of the line 5—5 of Fig. 1, but on the same scale as Fig. 4. While Fig. 5 shows the top in its depressed or folded position, Fig. 4 illustrates the top in its elevated position. In both Figs. 4 and 5 portions of the parts are broken away.

Fig. 6 is a diagrammatic view illustrating the general construction and mode of operation of the elevating means for raising and lowering the top, or roof. In this view a portion of the top is broken away.

Fig. 7 is a horizontal section taken on the line 7—7 of Fig. 1 upon an enlarged scale, and particularly illustrating the crank for raising and lowering the top, and the construction of the parts associated with the handle to enable the handle to disappear in the interior of the body of the trailer.

Fig. 8 is a fragmentary vertical section taken in a transverse plane upon an enlarged scale, and further illustrating details of a jack wheel carried at the front end of the trailer.

Fig. 9 is a fragmentary side elevation further illustrating this trailer wheel.

Fig. 10 is a vertical cross-section through the trailer, and illustrating another embodiment of the invention; also illustrating the trailer in its extended or set-up position.

Fig. 11 is a vertical section showing one side of the trailer illustrated in Fig. 10, broken away and illustrating the relation of the parts of the trailer when it is in its folded or knocked down condition.

Fig. 12 is a horizontal cross-section taken at the level of the line 12—12 of Fig. 13, but not showing the parts in the same relation which they have in Fig. 13. This view illustrates the manner in which a corner bracket is manipulated to swing around the outside of the corner post when setting up the trailer.

Fig. 13 is a vertical section upon an enlarged scale through one side of the trailer, broken away and showing the parts in the relation they have when a side wing of the trailer has been folded down in the act of folding the trailer into the closed position that is indicated in Fig. 11.

Fig. 14 is a horizontal section taken on the line 14—14 of Fig. 13, and further illustrating the relation of the parts in the side wall when in their folded condition, and before the top of the trailer has been lowered.

Fig. 15 is a plan upon an enlarged scale of the drawbar of the trailer, certain parts being broken away.

Fig. 15a is a side elevation of a double pin, or clevis, which is employed at the drawbar of the trailer to lock the drawbar in its coupled position after the hitch has been effected to the towing car.

Fig. 16 is a vertical section taken on the line 16—16 of Fig. 15; it is upon an enlarged scale, and further illustrates details of the coupling or hitch connection between the trailer and the towing car.

Fig. 17 is a view similar to Fig. 16, but with the jaws of the coupling shown in section, and indicated in dotted lines in their open position.

Fig. 18 is a fragmentary section corresponding to Fig. 2, and illustrating a modification of the construction at the side of the trailer.

Referring more particularly to the parts, 1 indicates the trailer body which is provided with an elevating top 2 which, in Fig. 1, is represented in its depressed position. In Fig. 2 the top is illustrated in an elevated position. In accordance with my invention, I provide means for raising this top at its four corners, and this means is preferably in the form of four guide posts 3, two of which are located at the forward end of the trailer, and two of which are located at the rear end (see Fig. 6, which illustrates this diagrammatically). These posts 3 are guided in the forward and rear walls in guides 4, such as illustrated in Fig. 4. They are carried by the top.

In order to raise and lower the top, I prefer to provide a sheave or pulley 5 corresponding to each guide post, and over these pulleys 5 lifting cables are provided, indicated generally by the reference numeral 6. These cables 6 include forward cables 6a and rear cables 6b. Suitable means is provided for operating these cables in unison. In the present instance I provide a forward shaft 7 and a rear shaft 8 mounted under the main floor 9 of the trailer, and these shafts are provided with means such as rollers 10 and 11 over which the cables pass. The forward roller 11 is simply a guide roller, and the cables 6a pass rearwardly from it and are secured to the rear roller 10 about which they wrap when the cables are being taken up to elevate the top. The cables 6b are similarly secured to the roller 10.

Suitable means is provided for rotating the take-up roller 10, which preferably includes a crank 12 located on the outer side of the trailer at the rear; and I prefer to provide this crank 12 with a disappearing handle 13 which is mounted loosely in the end of the crank (see Fig. 7) so that when the crank is in its position of rest, the handle 13 will be opposite to the socket or opening 14 in the rear side wall 15 of the trailer. Fig. 7 indicates the handle in its concealed position, and indicates by dotted lines how this handle can be pulled out to enable the crank to be rotated. To facilitate guiding the posts 3 up and down, I prefer to make them of bifurcated form so that they present two parallel bars 16, and between these bars guide pulleys or sheaves 17 are provided, in the groove of which the adjacent edges of the bars 16 run. These guide pulleys 17 may be mounted in the same bracket 18 that carries the lifting pulley 5 (see Fig. 4). For convenience in manufacture, the side bars 16 may be made of three plates secured together, the central plate 19 having its edge projecting further inwardly than the outside plates, and this plate 19 can be extended up so as to be secured to the top (see Fig. 4).

At each side of the main floor 9 relatively short side walls 20 are provided, which are fixed walls, and their upper edges are substantially in line with the upper sides of the fenders 21 over the wheels 22 on which the trailer is mounted. Adjacent the upper edges of the side walls 20, side floors 23 are respectively mounted and preferably secured by hinges 24 (see Figs. 1 and 2). This enables the side floors 23 to be normally held in a vertical folded position and permits them to be swung down to a horizontal position as indicated in Fig. 2. On these side floors, bed frames 25 rest, each bed frame carrying a mattress 26 secured to it by any suitable means such as straps (not illustrated). Each bed frame is provided at its inner edge with a bracket 27 that is connected by a hinge 28 with a bracket 29 secured to the inner side of the side wall. There should be at least two of these hinge connections for each bed frame. These brackets 27 and 29 are constructed so that the hinge joint 28 is located a considerable distance in from the side wall 20 and at a considerable distance below the hinge 24 for the side floor. With this arrangement it will be evident that when the bed frames and the side floors are folded up into a vertical position, a considerable space is provided between them for stowing away end extensions 30 and outer side walls 31; panels which cooperate with the side floors to form alcoves at the sides of the body when the trailer is completely set up. In order to facilitate putting these end extensions 30 and the outer side walls 31 into position, and in order to complete the alcove at each side, the trailer is provided with two roof extensions 32, which are preferably attached to the side edges of the top by waterproof hinge connections, and the roof extensions 32 are provided with channels 34 and 35 on their under sides, to receive the upper edges of the outer side walls 31 and the end walls 30. At its outer edge each side floor is provided with a longitudinal groove 36 to receive the lower edge of the outer side wall 31, and this groove is preferably formed by attaching an angle iron 37 to the under side of the side floor so that its vertical flange 38 (see Fig. 2) is located beyond the edge of the side floor. This angle iron is worked along on the ends of the side floors in the same way. (See Fig. 3).

Means are provided for bracing the side floors 23 and supporting them in a horizontal position. This means includes a pair of tie rods 39 corresponding to each side floor. At their upper ends these tie rods are connected by joints to the sides of the body in such a way as to enable them to be swung into a substantially horizontal position across the outer sides of the side floors when the same have been folded upwardly in their vertical position (see Fig. 1). This feature of my invention is important because it greatly facilitates the operation of folding up the trailer or setting it up. The joint connecting each tie rod 39 to the side of the body of the trailer preferably includes a shank 40, which is mounted to swivel in a plate 41 (see Fig. 3) attached to the side of the trailer, and this shank in the folded position of the side floor extends through an eye 42 in a bracket 43 secured to the side floor near its outer corner. Each tie rod 39 is connected by a pivot pin 44 to the end of the shank; that is to say, a hinge connection is formed to the outer end of the shank. When the tie rod 39 is in the position illustrated in Figs. 1 and 3, the axis of the pin 44 is in a vertical position. This permits the rod 39 to swing inwardly against the outer face of the adjacent side floor 23 in its upwardly folded position, and the side floor is provided with a bracket 45 forming a socket (see Fig. 2) for supporting this rod.

In setting up the trailer the rod is swung upwardly on the axis of the swivel shank 40 to disengage it from the socket at 45, and the swivel shank is then rotated further to bring the axis of the hinge pin 44 into a horizontal position, whereupon the tie rod can be swung down into its operative position as illustrated in Fig. 2. Of course, when starting to swing down the side floor, it is necessary to have the tie rod 39 aligned with the axis of the shank 40 until the eye 42 passes off of the shank, whereupon the eye 42 simply runs out toward the end of the tie rod as the side floor 23 swings down. The end of each tie rod is provided with a stop 46, which is preferably in the form of a nut with a knurled head 47, which nut is threaded on the end of the tie rod. These stops 46 may be provided with check nuts 48 if desired, so that they will not be getting out of adjustment.

In order to provide additional support for the side floors 23, I prefer to mount the fenders 21 of the trailer so that they can be let down on the tire of the wheels 22. Any suitable means may be provided for this purpose, but I prefer to accomplish this by pivoting the forward end of each fender at the bracket 49 where the forward end of the spring 50 is secured to the trailer; and I provide a releasable or disconnectible connection 51 at the rear end or side of the fender, which can be released or disconnected to permit the fender to be dropped down onto the tire of the wheel (see the left side of Fig. 2). The connection at 51 as illustrated, consists of a bracket 52 fixed to the trailer body, and a bracket 53 carried on the fender, the said brackets being connected by a bolt 54.

When the trailer is in its folded or collapsed condition illustrated in Fig. 1, the roof extensions 32 hang down in a vertical position and they completely cover the outer sides of the upwardly extending side floors 23. The lower edges of the roof extensions 32 can be secured in position by ordinary slide bolts 55, the lower ends of which are received in keepers 56 secured to the side of the body.

The trailer should be sufficiently long so that there is space provided beyond the ends of the bed frames, which space may receive a movable wardrobe 57, and when the trailer is in its folded condition these wardrobes are set on the main floor between the bed frames. Fig. 2 represents one of these movable wardrobes set up in position at the left, and indicates the other one in its packed position over the center line of the main floor 9.

The trailer includes end extensions 58, which seat over the main end walls 59 of the trailer body, and which may connect to them and to the under side of the top by means of dowel pins 60, such as illustrated in Fig. 2. These end extensions 58 can be stowed with the other extension parts in a space between the bed frames and their corresponding side floors in the folded condition of the trailer.

The trailer may be provided with one or more short disappearing legs 61, said legs being in the form of stems capable of disappearing into the walls of the trailer, as indicated in dotted lines at 61. When not in use these disappearing short legs would be clamped in their elevated position.

The forward end of the trailer should be provided with a suitable draw bar 62.

The trailer should be long enough to provide space at one end; for example, the rear end, to provide built-in fixtures for cooking, and for toilet accommodations.

Fig. 18 illustrates a modified construction for the side in which the side floor 23a has a rigid upstanding side footing 23b to which the side panel 23c is attached by hinges 23d, that enable the side panel 23c to fold in over the bed frame, as indicated by the dotted lines. This panel may be clamped down on the bedding by any suitable means (not illustrated) and holds the bedding in place in the folded position of the bed.

The mode of operation of the trailer in setting it up is substantially as follows:

The bolts 55 that hold in the roof extensions 32, should be released so as to permit the roof extensions 32 to swing upwardly on their hinges 33. The tie rods 39 should then be released from the socket brackets 45 and swung out of the way to permit the side floors 23 to be dropped down as far as permitted by the tie rods. The crank 12 should be operated to raise the top 2 to its elevated position. The end walls 30 and the end extensions 58 should then be put in place, and the top and the roof extensions lowered down onto them so as to secure these parts in place. In fitting down the roof extensions 32, their outer edges should be engaged with the vertical outer side walls 31. However, before putting the outer side walls 31 in place, the releasable connection 51 should be released so as to permit the adjacent fender 21 to drop down onto the tire of the adjacent wheel 22. This will enable the side floors 23 to be supported on the wheels, as well as being braced by the tie rods 39.

By placing the wheels 22 slightly toward the rear of the body, it may be unnecessary to provide disappearing feet 60 at the rear end of the trailer. However, in order to enable the trailer to be more secure in any set-up position, it may be advisable to provide disappearing feet such as the foot 60 at the rear of the trailer, as well as forward.

In order to insure that the folded trailer will be water-proof, the forward and rear edges of the roof extensions 32 should be provided with weather flaps (not illustrated) which will project over the vertical joints between the side floors and the ends of the body. These weather flaps have not been illustrated because they would make it more difficult to illustrate the invention.

In Figs. 10 to 14, I illustrate another embodiment of the invention in which I provide an end panel 63 that is attached by a substantially horizontal hinge connection 64 to the end wall 65 of the roof 66. When the corner posts 67 are elevated, this end panel 63 swings into the plane of the end wall 68. When the trailer is in its folded or collapsed condition, this end panel 63 is folded up into a substantially horizontal position under the roof (see Fig. 11). When this end panel 63 is in its set-up position its vertical edges such as the edge 69 (see Fig. 12) carry hinge connections 70, which attach corner brackets 71. These corner brackets are sufficiently long to extend down to a point near the upper ends of the corner guides 72. These corner guides 72 and the posts 67 are preferably made of angle iron, and the guides 72 are provided with inner flanges 73 that hold the posts 67 into the angle of the guide. After the panel 63 has been elevated as shown in Fig. 10, these corner brackets 71 are swung around on their hinges 70 as indicated by the arrow in Fig. 12, so that they will come into line with the corners 74 of the wall of the trailer body and envelop the outer sides of the posts 67. These corner brackets 71 are of angular form, and the side leg 75 of each corner bracket is provided with a batten 76 that will seat against the outer face of the adjacent leg of the angle iron that forms the post 67. The outer face of this leg 75 also carries a vertical batten 77 that comes into line with the corresponding batten 78 secured on the outer side of the corner 74 and on the side wall of the body. On the end of the leg 75 a fastening button 79 or other similar fastening is provided for a purpose which will appear hereinafter.

On the edges 80 of the corners 74 of the body, wing end panels 81 are connected by hinge connections 82, and the upper edges of these wing end panels carry substantially triangular upper end panels 83 connected to the same by hinge connections 84. In setting up the trailer from its folded condition, after these wing end panels 81 are swung out to a position substantially at right angles to the longitudinal axis of the trailer, side floors 85 similar to the side floors 23 are swung down to a horizontal position on their hinge connections 86, being supported on their under sides by the fenders 87 of the trailer. The outer edges of the side floors 86 carry side panels 88, which are attached to them by hinge connections 89 at the lower edges of the side panels. After the side floors 85 have been folded out and the side panels 88 extended outwardly as indicated by the dotted lines 88a in Fig. 10, then the wing end panels 81 and 83 are swung in over the floor 83 and the side panels 88 are swung up against the outer edges of the wing end panels 81. The roof section 90, which is hinged to the roof like the roof section 32, is then swung down and fits against the inclined edge 91 of the upper end panel 83. Preferably the roof section 90 projects somewhat beyond the side panel 88 so as to form edges 91 to shed water.

When the upper end panels 83 are in position, they seat against the batten 77 and are held against the same by the turn button 79 (see Fig. 10).

When a trailer constructed in this way is collapsed, the roof section 90 forms a side wall of the trailer (see Fig. 11) and the lower edge of this roof section is received under a cleat 92 that is secured to the fixed side 93 of the trailer body.

In Figs. 1, 15, 16, and 17, I illustrate a drawbar hitch for enabling the front end of the trailer to be secured to a towing car. The towing car is preferably provided with a substantially cylindrical head or "ball" 94 (see Fig. 16), having a vertical shank 95 which secures it to the towing car. The hitch includes a drawbar 96 having a shank 97 that is rigidly secured under the forward end of the trailer, and the forward end of this drawbar is provided with two jaws, or socket sections 98, that are mounted to swing on pivot pins 99 and which, in the closed position of the socket formed by these sections, will lie in the U-shaped throat 100 formed in the forward end of the drawbar.

Fig. 16 shows these two socket sections in their closed position, in which they retain the ball or head 94. When the trailer is to be coupled to the towing car, these jaws, or socket sections, are swung outwardly as indicated in the dotted lines in Fig. 17. This opens the socket so that when the head 94 is moved rearwardly into the socket, the socket sections will rotate on their pivot pins 99 into a position to retain the ball or head 94. After they have rotated into this position, as indicated in Fig. 17, these socket sections are locked in this position by means of a clevis 101, which is a double pin having two forks 102, which pass down through openings 103, which align with similar openings in the plates, or bodies 104 of the socket sections (See Fig. 16, which indicates the position of the clevis in dotted lines). This clevis may be attached to the drawbar by means of a small chain. This is indicated in dotted lines in Fig. 1.

In order to enable the drawhead 94 to align properly with the open socket formed by the open socket sections 98, I prefer to provide means for tilting the body of the trailer slightly on the axis of its wheels 22. For this purpose I prefer to provide a jack wheel 105 carried on a forked arm 106, the upper end of which is attached by a pivot bolt 107 to a tongue 108 projecting down from the rear end of the drawbar 96. This arm 106 can swing on pivot 107 in a transverse plane, and is offset or curved so that the wheel 105 is normally out of line with the vertical plane passing down through the pivot 107. The arm 106 is constructed so that a lever 109 indicated in dotted lines in Fig. 9, can be secured to it and pushed down so as to raise or lower the drawbar; in other words, to tilt the forward end of the trailer upwardly.

The bracket 108 is provided with a segment, or sector, having a plurality of pinholes 110, which cooperate with a removable pin 111 carried by the head of the arm 106 near its pivot 107. It is evident that this gives a desirable adjustment for enabling the forward end to be held at the same level as the drawhead on the towing car when it backs toward the trailer to couple the trailer to it.

When the trailer is running along the road, the trailer wheel 105 can be swung up and held in an elevated position above the surface of the roadway, by any suitable means, not illustrated.

The sides 88, and if desired, the wing end panels 81 and 83 may be provided with windows, which have not been illustrated as they do not concern the invention.

The construction for the forward end wall of the trailer would be such as to enable a doorway to be formed to give access to the interior of the trailer. The construction at the forward end would be substantially the same as at the rear end, except that the end panel corresponding to the panel 63 would have a deep notch cut into it corresponding to the width of the doorway, which would be cut in the forward end wall.

It is to be understood that the embodiment of the invention described herein is only one of the many embodiments this invention may take, and I do not wish to be limited in the practice of the invention, nor in the claims, to the particular embodiment set forth.

What I claim is:

1. In a trailer, the combination of a body having side floors with means for connecting the same to the body with the side floors in a substantially horizontal position, wheels for the body located under the extended side floors and movable fenders mounted over the wheels, said side floors operating to rest on the fenders when the same are in their extended position, and latch means for normally supporting said fenders clear of the wheels and releasable to permit said fenders to rest on the wheels, whereby the weight of said side floors, when they are in extended position, is transferred through the fenders to the wheels.

2. In a folding trailer, the combination of a body, a side floor hingedly connected to the body capable of assuming a folded position in a substantially vertical plane and capable of swinging down to a substantially horizontal position projecting from the body, rigid tie rods movably attached to the ends of the body forward and aft of the side floors, brackets on the side floors near their outer corners having eyes through which the tie rods are guided, said tie rods operating as diagonal braces and supports for the corners of the side floors when in a substantially horizontal extended position, and operating to slide on said eyes when the side-floors are swung up to their closed position, and means associated with the ends of the tie rods at the brackets for tightening up the tie rods.

3. An automobile trailer constructed in accordance with claim 2, in which the connection between the tie rods and the trailer body includes a swivel shank hingedly connected to the tie rod enabling the tie rods to swivel on the axes of the shanks and folded into a substantially horizontal direction across the outer side of the side floor to hold up the side floors when the same are being folded into their vertical folded position.

4. An automobile trailer constructed in accordance with claim 2, in which the connection between the tie rods and the trailer body includes a swivel shank hingedly connected to the tie rod enabling the tie rods to swivel on the axes of the shanks and folded into a substantially horizontal direction across the outer side of the side floor to hold up the side floors when the same are being folded into their vertical folded position, and means on the outer sides of the side floors when in their vertical position for supporting the tie rods.

5. In an automobile trailer, the combination of a body having an elevating top, and a side wall, a crank mounted at the side of the body, means actuated by the crank for raising the top, said crank mounted for rotation in a plane adjacent to the said side wall of the body and having a handle capable of projecting outwardly from the crank on its outer face, said handle being movably mounted in the crank so that the same can slide inwardly, and said side wall having an opening to receive and conceal the handle when the same has been moved inwardly through the crank.

6. In a folding trailer, the combination of a substantially rectangular body having guides at the corners thereof, posts mounted to slide on the said corner guides and adapted to be moved up to an elevated position when the trailer is to be set up in its extended position, said body having an end wall, a roof carried by the said posts, a main end panel connected with the said posts and having a substantially horizontal hinge connection adjacent the said roof, said main end panel in the folded condition of the trailer lying within the body back of the said end wall, a corner bracket hingedly attached to each vertical edge of the end panel in the set-up position of the trailer and capable of swinging around on the hinge connection to the outer side of the adjacent post, a wing end panel hingedly connected to each guide and adapted to swing out to an extended position substantially at right angles to the longitudinal axis of the trailer, a substantially triangular upper wing panel hingedly connected to the upper edge of the wing end panel and adapted to swing up into a vertical position in the plane of the wing end panel to seat against the said corner bracket, and a roof section hingedly connected to the edge of the roof and fitting down over the upper edge of the upper wing end panel.

7. In a folding trailer, the combination of a substantially rectangular body having guides at the corners thereof, posts mounted to slide on the said corner guides and adapted to be moved up to an elevated position when the trailer is to be set up in its extended position, said body having an end wall, a roof carried by the said posts, a main end panel connected with the said posts and having a substantially horizontal hinge connection adjacent the said roof, said main end panel in the folded condition of the trailer lying within the body back of the said end wall, a corner bracket hingedly attached to each vertical edge of the end panel in the set-up position of the trailer and capable of swinging around on the hinge connection to the outer side of the adjacent post, a swing end panel hingedly connected to each guide and adapted to swing out to an extended position substantially at right angles to the longitudinal axis of the trailer, a substantially triangular upper wing panel hingedly connected to the upper edge of the wing end panel and adapted to swing up into a vertical position in the plane of the wing end panel to seat against the said corner bracket, a roof section hingedly connected to the edge of the roof, fitting down over the upper edge of the upper wing end panel, a side floor hingedly connected at its lower and inner edge to the said body, normally occupying a substantially vertical plane and adapted to swing down to a substantially horizontal position projecting outwardly at the side of the trailer, and a side wall hingedly attached to the outer edge of the side floor capable of swinging up to a substantially vertical position seating against the outer edge of the wing end panel, and with its upper edge located under the lower edge of the roof section.

8. In a folding trailer, the combination of a corner post, a top attached to the post, a wall panel hingedly supported by the top to swing on a substantially horizontal axis into a substantially vertical plane with its side edge adjacent to the corner post, a corner bracket having a hinge connection to the said side edge of the panel adjacent to the corner post and capable of swinging on its hinge connection around to envelop the outer side of the post when the panel is in a vertical plane, and another wall panel seating against the corner bracket at the outer side of the corner post.

9. In a folding trailer, the combination of a corner post, a top attached to the post, a wall panel hingedly supported by the top to swing on a substantially horizontal axis into a substantially vertical plane with its side edge adjacent to the corner post, a corner bracket having a hinge connection to the said side edge of the panel adjacent to the corner post and capable of swinging on its hinge connection around to envelop the outer side of the post when the panel is in a vertical plane, another wall panel disposed in substantially the same plane as the first-named panel, and seating at its inner edge on the outer side of said corner bracket.

10. In a folding trailer, the combination of a corner post, a top attached to the post, a wall panel hingedly supported by the top to swing on a substantially horizontal axis into a substantially vertical plane with its side edge adjacent to the corner post, a corner bracket having a hinge connection to the said side edge of the panel adjacent to the corner post and capable of swinging on its hinge connection around to envelop the outer side of the post when the panel is in a vertical plane, another wall panel disposed in substantially the same plane as the first-named panel, and seating at its inner edge on the outer side of said corner bracket, said corner bracket having a batten on its outer side remote from its hinge connection to engage the outer side of the second-named wall panel adjacent its seated edge, and means carried on the corner bracket for locking the second-named panel against the said batten.

11. In a folding trailer, the combination of a body having a corner with a corner guide, a corner post guided to slide vertically up from the corner guide, a top supported on the post, a wall panel hingedly supported from the top to move on a substantially horizontal axis and capable of swinging down into a vertical plane so as to present its side edge adjacent to said post, a corner bracket having a hinge connection on said side edge and capable of swinging around to envelop the outer sides of said post and align itself with the end of said corner guide, and another wall panel seating against the outer side of said corner bracket.

12. In a folding trailer, the combination of a body having a corner with a corner guide, a corner post guided to slide vertically up from the corner guide, a top supported on the post, a wall panel hingedly supported from the top to move on a substantially horizontal axis and capable of swinging down into a vertical plane so as to present its side edge adjacent to said post, a corner bracket having a hinge connection on said side edge and capable of swinging around to envelop the outer sides of said post and align itself with the end of said corner guide, another wall panel lying in substantially the same plane as the first-named wall panel and seating at its inner edge against the outer side of the corner bracket, and means on the corner bracket for engaging the last-named wall panel to hold the same in place.

CHARLES L. BOND.